Oct. 16, 1962
C. DE PREZ
3,059,034
PROCESS OF HYDROHALOGENATION OF ACETYLENE
Filed Dec. 30, 1958
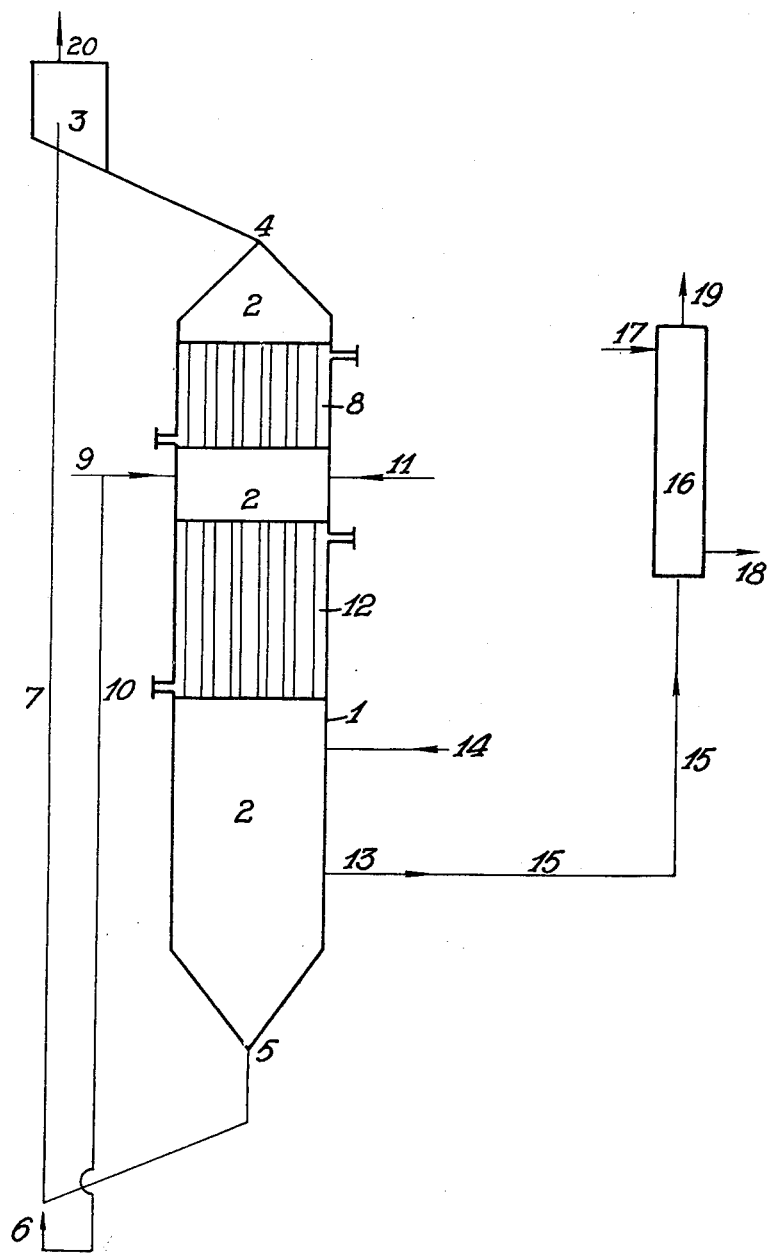

United States Patent Office 3,059,034
Patented Oct. 16, 1962

3,059,034
PROCESS OF HYDROHALOGENATION OF ACETYLENE
Charles de Prez, Uccle-Brussels, Belgium, assignor to Solvay & Cie., Brussels, Belgium, a Belgian company
Filed Dec. 30, 1958, Ser. No. 783,971
Claims priority, application Belgium Dec. 31, 1957
4 Claims. (Cl. 260—656)

The present invention concerns a process of hydrohalogenating hydrocarbons, in particular the hydrochlorination of acetylene by means of hydrogen chloride in the presence of an adsorbing material and of catalysts.

Another object of the invention is a process of preparing 1,1,2-trichlorethane by chlorinating, by means of gaseous chlorine, monochlorethylene obtained by hydrochlorination of acetylene by means of hydrogen chloride in the presence of an adsorbing material and catalysts. Further objects of the invention will appear in the following.

The synthesis of monochlorethylene by hydrochlorination of acetylene by means of hydrogen chloride is a strongly exothermic reaction. It is consequently necessary to remove the heat released which would volatilise the catalyst, for example mercuric chloride. It has always been considered convenient to use for this purpose powerful cooling systems, especially since the cooling of the reaction zones has up to now always been performed externally. The temperature has thus been irregularly distributed along the cross-section of these zones. By reason of the large quantity of heat released, it is necessary first of all to hydrochlorinate the acetylene in a first zone in the presence of a quantity of catalyst insufficient to initiate the complete reaction in order to prevent the temperature attaining elevated values, the reagents diluted by the monochlorethylene formed in this zone being led towards another zone where the reaction is achieved in the presence of a quantity of suitable catalyst in an increase concentration.

The applicant has found that by introducing acetylene and hydrogen chloride into a moving bed of adsorbing material in the presence of catalysts, one can operate directly in the presence of the quantity of catalyst appropriate for forming the mono-chlorethylene and this without any risk of volatilizing the catalyst. The applicant has found furthermore, that the temperature was regularly distributed over all the cross-section of the reaction zones and that it was not necessary to have recourse to powerful cooling systems, since one can arrange those systems within those zones.

As moving bed material there is preferably selected active carbon. All other porous materials may be used, however, such as wood charcoal, animal charcoal, coke, gels, of silica or of alumina, etc. The appropriate catalysts are selected which are supported by adsorbing material. Among the catalysts there may be mentioned the metal chlorides and particularly mercuric chloride.

The monochlorethylene obtained is evacuated from the moving bed, washed and condensed. Chlorine may be introduced into the moving bed for chlorinating in the gaseous phase monochlorethylene prepared by hydrochlorination of acetylene and to obtain in this way 1,1,2-trichlorethane which is evacuated from the moving bed and condensed. One can re-use the monochlorethylene for transformation into 1,1,2-trichlorethane for example by cooling it and introducing it into a batch of 1,1,2-trichlorethane where it is subjected to chlorination by means of gaseous chlorine. This operation is carried out in a special compartment in the same apparatus.

The 1,1,2-trichlorethane is recovered and can serve for example for the preparation of 1,1-dichlorethylene by distillation in the presence of milk of lime, caustic soda or caustic potash.

An advantage of the process which is not negligible is that it may be carried out continuously, the unreacted components being recycled.

The invention is explained in detail with reference to the single figure of the accompanying drawing which is given for the purpose of illustration. It must be understood that it does not in any way limit the scope of the invention which is capable of numerous variations without departing from its spirit.

The FIGURE shows very schematically an apparatus in which the process which forms the object of the invention is carried out.

In the reactor 1 circulates from the top to the bottom a bed of adsorbing material 2 which is, for example, active carbon supporting the catalyst such as mercuric chloride present in a proportion of 2–5% by weight of mercury with respect to the adsorbing material. The latter descends from a batch reservoir 3, enters the reactor at 4 and leaves it at 5. It is charged into the batch reservoir by means of a blower 6 and the pipe 7. As a fluid driving means for raising the adsorbing material, hydrogen chloride is preferably selected. The latter is led by pipe 10 along which a part of the hydrogen chloride entering the reactor is derived. This hydrogen chloride is removed at 20 and recovered.

From top to bottom the reactor comprises: a first zone provided with a cooler 8; a zone for introduction of hydrogen chloride and acetylene having inlet tubes 9 and 11 for these gases; the reaction zone provided with a cooling device 12; and the zone for evacuation of monochlorethylene provided with an outlet tube 13 for this gas.

The adsorbing material falling down the reactor 1 is first cooled to a suitable temperature by the apparatus 8 through which water circulates. Through tubes 9 and 11 hydrogen chloride and acetylene are introduced in a molecular ratio of 1:1. The hydrogen chloride may be provided from any source: chloride obtained by direct synthesis or resulting from organic chlorinations, particularly the hydrogen chloride formed in the preparation of tri- and perchlorethylene by direct chlorination of acetylene in a moving bed of adsorbing material. The two reactors may thus be coupled, the first serving for the preparation of tri- and perchlorethylene, the hydrogen chlorine recovered being purified if necessary before being introduced into the apparatus serving for carrying out the process according to the invention.

Because the synthesis of monochlorethylene from acetylene and hydrogen chloride is exothermic, it is necessary to cool the reaction zone rather strongly, principally to avoid volatilizing the catalyst. But by reason of the movement of the particles of the moving bed and the efficacy of the cooling device 12 arranged at the core of the reaction zone, there is no temperature gradient along the cross-section of this zone. Moreover, the temperature is very readily kept between 100 and 110° C. and it is found that the process can be operated directly at a catalyst concentration suitable for completing the reaction.

The monochlorethylene formed is then evacuated from the reactor 1 by the pipe 13. It is subsequently washed and condensed.

One can provide for the formation of 1,1,2-trichlorethane in the moving bed itself; in such a case, the chlorine is injected at 14 and the reaction takes place in the gaseous phase at a temperature comprised between 130 and 150° C. At 13, the 1,1,2-trichlorethane is evacuated and the unreacted products can be recycled.

The 1,1,2-trichlorethane obtained may be led, by pipe 15, to the continuous distiller 16 where it is transformed into 1,1-dichlorethylene, the distiller being supplied with milk of lime at 17. At 18, the milk of lime, having reacted with the 1,1,2-trichlorethane, is withdrawn from the distiller 16. The 1,1-dichlorethylene is recovered at 19; it is then subjected to rectification. Caustification can be carried out equally well by means of NaOH or KOH.

The monochlorethylene can again be recovered, cooled and introduced into a batch of 1,1,2-trichlorethane arranged in a cooled container at the foot of the reactor. By introducing gaseous chlorine into this container, 1,1,2-trichlorethane is prepared at a temperature comprised between 20 and 30° C., if desired in the presence of catalysts such as iron.

I claim:

1. In a process for hydrochlorinating acetylene, the steps of providing, in a single reaction vessel, a downwardly-movable bed of an adsorbent which has been impregnated with about 2 to 5% by weight of a catalyst favorably effecting the rate of reaction between acetylene and hydrogen chloride, cooling the upper portion of said bed to define a cooling zone wherein the adsorbent is cooled, introducing hydrogen chloride and acetylene in a molecular ratio of 1:1 into a second zone of said bed below said cooling zone, cooling a third zone of said bed below said second zone into which said hydrogen chloride and acetylene are introduced and from which said hydrogen chloride and said acetylene are carried by said downwardly moving movable bed to provide a cooled reaction zone maintained at a temperature of about 100° and 110° C., wherein said hydrogen chloride and said acetylene interact to form monochloroethylene, removing said monochloroethylene from said movable bed in a lower zone of said bed below said cooled reaction zone, condensing said monochloroethylene, and recycling the adsorbent to said cooling zone by means of an ascending stream of hydrogen chloride.

2. In a process for hydrochlorinating acetylene, the steps of providing, in a single reaction vessel, a downwardly-movable bed of an adsorbent selected from the group consisting of wood charcoal, animal charcoal, silica gel and alumina which has been impregnated with about 2 to 5% by weight of a metal chloride catalyst, cooling the upper portion of said bed to define a cooling zone wherein the adsorbent is cooled, introducing hydrogen chloride and acetylene in a molecular ratio of 1:1 into a second zone of said bed below said cooling zone, cooling a third zone of said bed below said second zone into which said hydrogen chloride and acetylene are introduced and from which said hydrogen chloride and said acetylene are carried by said downwardly moving movable bed to provide a cooled reaction zone maintained at a temperature of about 100° to 110° C., wherein said hydrogen chloride and said acetylene interact to form monochoroethylene, removing said monochloroethylene from said movable bed in a lower zone of said bed below said cooled reaction zone, condensing said monochloroethylene, and recycling the adsorbent to said cooling zone by means of an ascending stream of hydrogen chloride.

3. In a process for hydrochlorinating acetylene, the steps of providing, in a single reaction vessel, a downwardly-movable bed of an adsorbent which has been impregnated with about 2 to 5% by weight of a catalyst favorably effecting the rate of reaction between acetylene and hydrogen chloride, cooling the upper portion of said bed to define a cooling zone wherein the adsorbent is cooled, introducing hydrogen chloride and acetylene in a molecular ratio of 1:1 into a second zone of said bed below said cooling zone, cooling a third zone of said bed below said second zone into which said hydrogen chloride and acetylene are introduced and from which said hydrogen chloride and said acetylene are carried by said downwardly-moving movable bed to provide a cooled reaction zone maintained at a temperature of about 100 to 110° C., wherein said hydrogen chloride and said acetylene interact to form monochloroethylene, introducing gaseous chlorine into a fourth zone of said bed below said cooled reaction zone and maintaining a temperature of 130 to 150° C. in said fourth zone to form 1,1,2-trichloroethane from the monochloroethylene formed from the interaction of said acetylene with said hydrogen chloride, removing said 1,1,2-trichloroethane from said movable bed in a lower zone of said bed below said fourth zone, condensing said 1,1,2-trichloroethane, and recycling the adsorbent to said cooling zone by means of an ascending stream of hydrogen chloride.

4. In a process for hydrochlorinating acetylene, the steps of providing, in a single reaction vessel, a downwardly-movable bed of an adsorbent selected from the group consisting of wood charcoal, animal charcoal, silica gel and alumina which has been impregnated with about 2 to 5% by weight of a metal chloride catalyst, cooling the upper portion of said bed to define a cooling zone wherein the adsorbent is cooled, introducing hydrogen chloride and acetylene in a molecular ratio of 1:1 into a second zone of said bed below said cooling zone, cooling a third zone of said bed below said second zone into which said hydrogen chloride and acetylene are introduced and from which said hydrogen chloride and said acetylene are carried by said downwardly moving movable bed to provide a cooled reaction zone maintained at a temperature of about 100° to 110° C., wherein said hydrogen chloride and said acetylene interact to form monochloroethylene, introducing gaseous chlorine into a fourth zone of said bed below said cooled reaction zone and maintaining a temperature of 130 to 150° C. in said fourth zone to form 1,1,2-trichloroethane from the monochloroethylene formed from the interaction of said acetylene with said hydrogen chloride, removing said 1,1,2-trichloroethane from said movable bed in a lower zone of said bed below said fourth zone, condensing said 1,1,2-trichloroethane, and recycling the adsorbent to said cooling zone by means of an ascending stream of hydrogen chloride.

References Cited in the file of this patent

UNITED STATES PATENTS

| | | |
|---|---|---|
| 1,944,306 | Soll | Jan. 23, 1934 |
| 2,399,488 | Hearne | Apr. 30, 1948 |
| 2,756,127 | James et al. | July 24, 1956 |
| 2,756,247 | James et al. | July 24, 1956 |

FOREIGN PATENTS

| | | |
|---|---|---|
| 769,773 | Great Britain | Mar. 13, 1957 |